United States Patent [19]

Brumbaugh et al.

[11] 3,974,237

[45] Aug. 10, 1976

[54] BLOCK COPOLYMER PROCESSES

[75] Inventors: Kenneth H. Brumbaugh; James J. McAlpin, both of Baytown, Tex.

[73] Assignee: Exxon Research and Engineering Company, Linden, N.J.

[22] Filed: Feb. 21, 1975

[21] Appl. No.: 551,895

[52] U.S. Cl. .............................................. 260/878 B
[51] Int. Cl.² ........................................ C08F 297/08
[58] Field of Search ................................. 260/878 B

[56] References Cited
UNITED STATES PATENTS

| | | | |
|---|---|---|---|
| 3,442,978 | 5/1969 | Khelghatian et al. | 260/878 B |
| 3,719,643 | 3/1973 | Knight | 260/94.9 P |
| 3,780,136 | 12/1973 | Khelghatian et al. | 260/878 B |
| 3,798,288 | 3/1974 | McManimie et al. | 260/878 B |
| 3,853,969 | 12/1974 | Kontos | 260/878 B |

FOREIGN PATENTS OR APPLICATIONS

| | | | |
|---|---|---|---|
| 1,006,469 | 10/1965 | United Kingdom | 260/878 |

*Primary Examiner*—Alan Holler
*Attorney, Agent, or Firm*—David A. Roth

[57] ABSTRACT

A process for the copolymerization of alpha-olefins to form a block olefinic copolymer. In these processes solid polymeric alpha-olefin which contains an active catalyst is fed into two parallel fluid-bed reactors and concurrently, two different, gaseous, olefinic monomer streams are cyclically fed into first one reactor and then the other. The block olefinic copolymer is continuously withdrawn from the reactors during the cyclic injection thereinto.

10 Claims, 1 Drawing Figure

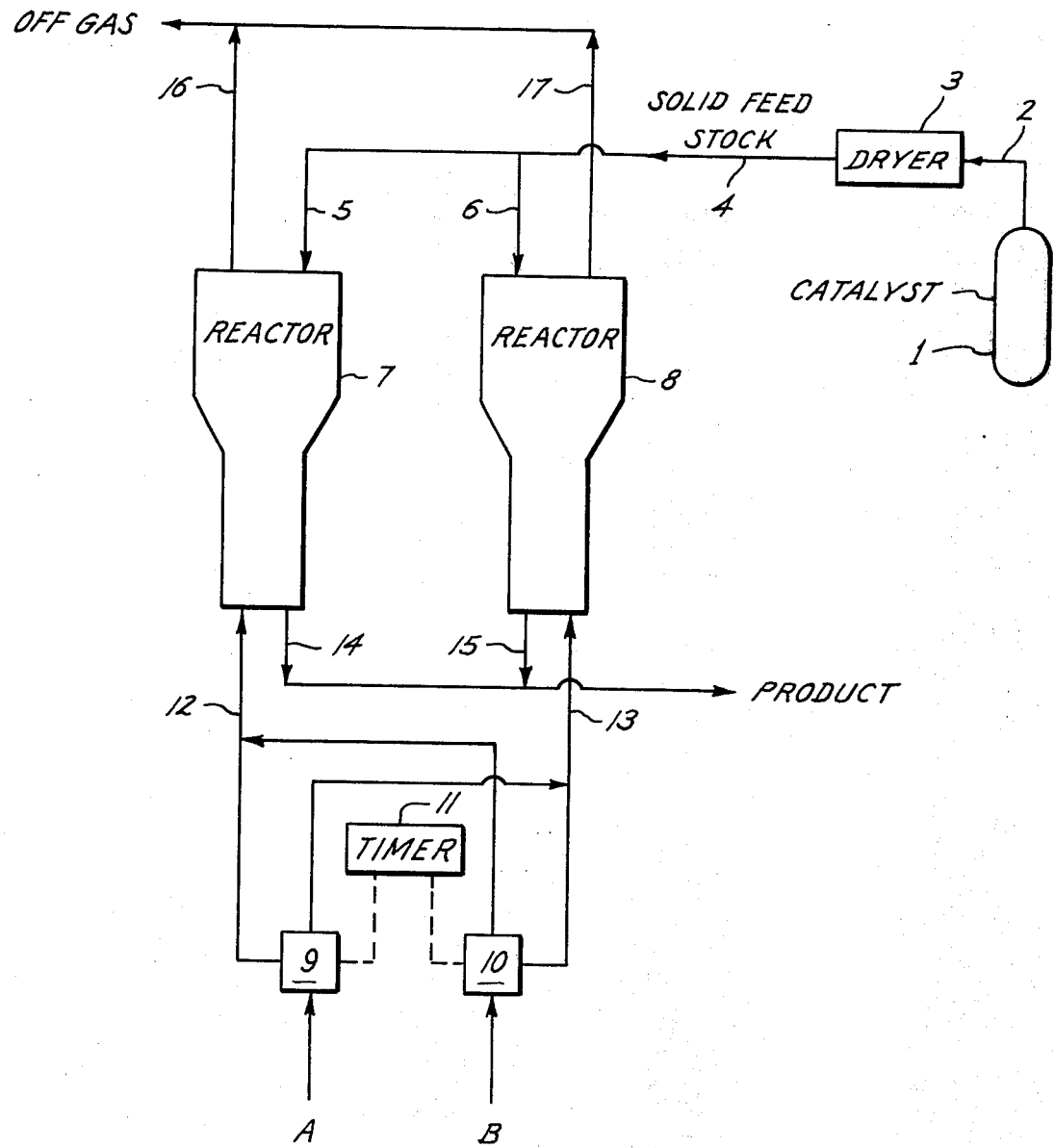

BLOCK COPOLYMER PROCESSES

BACKGROUND OF THE INVENTION

The prior art considered in conjunction with the preparation of this patent application is U.S. Pat. No. 3,472,829; 3,732,335 and 3,776,979. These patents and any other publications disclosed herein are to be considered as incorporated, in toto, herein by reference for all intents and purposes.

The present invention relates to a process for the preparation of polypropylene modified by a copolymer of propylene and another alpha-olefin.

Isotactic polypropylene is known to have excellent mechanical characteristics at room temperature and above; however, at temperatures below 5° C., its impact resistance is rather poor. A block or heterblock copolymer constituted by segments of a random ethylene/propylene copolymer and by segments of isotactic polypropylene which contains relatively little ethylene has much better mechanical properties at low temperature than those of isotactic polypropylene. On the other hand, at room temperature or above, the physical and mechanical characteristics of such a copolymer are modified only slightly with respect to those of isotactic polypropylene.

The preparation of block or heterblock copolymers or at least one alpha-olefin by alternating polymerization is well known. This process can be carried out by modifying the composition and nature of the monomer(s) contacted with the polymerization catalyst as has been disclosed by British Pat. No. 838,996 of Dec. 27, 1955, issued to Goodrich Gulf Chemicals, French Pat. No. 1,018,971 of May 5, 1950, and Belgian Pat. No. 560,366 of Aug. 28, 1957 issued to Bataafsche Petroleum.

The known technique for preparing modified polypropylene generally involves preparing a product which is comprised mainly of isotactic polypropylene and segments of an ethylene/propylene copolymer having random distribution, as disclosed in French Pat. No. 1,220,947 of Jan. 8, 1959, issued to Phillips Petroleum Company and French Pat. No. 1,220,573 of Apr. 16, 1959, issued to Montecatini. Similar products may also be obtained from butene-1 and another higher alpha-olefin. "Ziegler" type catalysts are generally used for these processes.

It is know that propylene polymers which are modified by randon propylene/second alpha-olefin copolymers may be prepared in two different ways, depending on the order chosen for the introduction of the monomers: homopolymer, then the random propylene/second alpha-olefin copolymer; or random propylene/second alpha-olefin copolymer, then homo-polymer.

In French Pat. No. 1,294,608 of July 10, 1961, issued to Hoechst (this patent and each of the foregoing mentioned patents are incorporated by reference), the preparation of a polyolefin with an improved impact resistance is described in which:

1. A copolymer is prepared by polymerizing a mixture of 75 to 30% by volume of ethylene and 25 to 70% by volume of propylene or butene-1 in the presence of 0.5 to 5 millimoles of $TiCl_3$ per liter of dispersant and 0.5 to 10 millimoles of triethylaluminum per liter of dispersant to obtain up to 20% by weight of the total misture of polymers, and 2. After addition of 5 to 10 supplemental millimoles of $TiCl_3$ per liter of dispersant and 10 to 30 millimoles of diethylaluminum monochloride per liter of dispersant, a homopolymer is prepared by polymerizing olefins having from 2 to 10 carbon atoms, this homopolymer representing 98 to 80% by weight of the total mixture of polymers.

The triethylaminum activator promotes the formation of an amorphous copolymer, whereas diethylaluminum monochloride promotes the formation of a highly crystalline compound.

The foregoing process (French Pat. No. 1,294,608) wherein a random copolymer is produced first and then an olefin is homopolymerized to produce a homopolymer chain has numerous disadvantages.

When a random propylene/second alpha-olefin copolymer is prepared first, the second alpha-olefin must be eliminated before effecting the homopolymerization. In order to eliminate the alpha-olefin involved in the copolymerization, either the second alpha-olefin must be expanded or the reaction must be extended until the entire quantity of the second alpha-olefin is consumed. Moreover, the presence of residual quantites of triethylaluminum in the second step of such a process influences homopolymerization, favoring the formation of a poorly crystalline homopolymer.

The formation of an amorphous copolymer in an inert reaction medium, according to the process of the above-mentioned French Pat. No. 1,294,608, also involves numerous technological difficulties due to the dissolution of the resultant copolymer in the reaction medium.

BRIEF DESCRIPTION OF THE INVENTION

We have discovered a polymerization process whereby the disadvantages of previous processes as discussed above are avoided.

According to the invention, an olefinic homopolymer is modified by combination with a block copolymer comprised of alternating segments of homopolymer and random copolymer in the presence of a Ziegler type catalyst.

This process utilizes two reactors operating in parallel with a single homopolymer feed injected into both reactors with two different gaseous, monomer olefin feeds being cyclically injected into the reactors, i.e. one gaseous feed to one reactor and the other gaseous feed to the other reactor, said gaseous feeds being simultaneously switched to the opposite reactor at a predetermined frequency. Concurrently there is a continuous withdrawal of the block copolymer end product and monomer from both reactors.

In the process of the present invention, an olefin, such has propylene, is polymerized in the presence of a suitable catalyst such as violet $TiCl_3$ and dialkylaluminum monochloride until polypropylene in an amount of about 60% by weight of the total quantity of polymer to be prepared is formed.

The invention is applicable to the vapor phase polymerization of ethylene, propylene, butene-1, butadiene, pentene-1 and 3-methylbutene to obtain block copolymers of such olefins. It is to be understood that the term "copolymer" as employed in this application refers to the polymerization of two or more of the named olefins to obtain block olefin polymers. The invention is particularly applicable in the preparation of ethylene-propylene block copolymers.

DESCRIPTION OF THE DRAWING

The drawing is a schematic representation of the apparatus comprising two reactors in communication with each other which may be used to carry out the process of the present invention in a continuous manner.

Referring to the drawing, vessel 1 provides a means for the production of the homopolymer according to methods already known in the art. The resulting mixture of homopolymer, reaction solvent and live catalyst is transferred via line 2 to dryer 3 wherein the solvent is removed therefrom and thus conveyed by line 4 and branch lines 5 and 6 respectively into fluidized bed-reactors 7 and 8. The fluidized bed-reactors 7 and 8 can be any typical fluid bed-reactor presently known in the art such as those mentioned in the publications set forth herein and there is no criticality in the shape, size or design thereof.

Gaseous olefinic stream A and B are injected into reactors 7 and 8 by first being channeled through fast acting solenoid valves 9 and 10, which are controlled by a cyclic timer 11. As shown in the drawing, the gases are injected into the lower most portion of the respective fluidized bed-reactors via the respective lines 12 and 13. Once the system is in equilibrium, the desired end product, i.e., the block copolymer, is concurrently removed via lines 14 and 15 from the bottom of said reactors. Lines 16 and 17 located at the uppermost portion of reactors 7 and 8 provide means for the exit of by-product gases.

Where one so desires to increase the efficiency of the operation, the off gas streams 16 and 17 can be recovered individually and recycled respectively to the reactors 7 and 8 via valves 9 and 10. If this facet is undertaken, provision must be made for segregating the off gas streams by supplying suitable delay circuitry and appropriate automatic valving. Furthermore, there must be provided heat transfer means to remove heat from the recycled streams.

The end product can be used as such, subjected to further processing steps or it can be packaged and stored for future use. Still further, the end product can be used as an intermediate with other chemicals to produce other end products.

GENERAL DESCRIPTION OF THE INVENTION

In conjunction with the preparation of block copolymers, suitable monomer charge stocks include all the alpha olefins such as ethylene, propylene, butene-1, pentene-1, hexene-1, etc., particularly the $C_2$ and $C_6$ alpha olefins either alone for homopolymers or in combinations for copolymers.

These olefins used alone or in any combination constitute the make-up of the gaseous streams A and B hereinafter described.

The catalyst employed in the vapor phase polymerization of the above-named olefins comprises conventional solid finely divided catalyst compositions that catalyze the polymerization of the olefins to solid polymers. These catalyst compositions include catalysts comprising chromium oxide, a substantial portion of the chromium oxide being the hexavalent state, associated with at least one other porous solid, normally an oxide selected from the group consisting of silica, aluminum, zirconium and thoria. Catalysts of this description are described in U.S. Pat. No. 2,825,721, issued Mar. 4, 1958. Finely divided Ziegler-type catalyst compositions such as described in U.S. No. 3,219,648 can also be employed in the vapor phase polymerization of olefins to produce block copolymers. Reference is made to the above-named patents for a description of methods of preparing their respective catalyst compositions which can suitably be employed in the novel block copolymerization process.

Although not to be limited thereto, catalysts of the Ziegler type are preferred. Ziegler-type catalyst compositions found to be effective in the practice of the invention are those formed by combining an organometallic compound of a metal of Groups II-A, II-B and III-A of the Periodic Table with a halide of a metal of Groups IV-B, V-B or VI-B of the Periodic Table. These catalyst compositions are conveniently produced by reacting the organometallic compound with a metal halide in the presence of a hydrocarbon solvent such as isooctane, n-heptene, xylene or benzene. The molar ratio between the organometallic compound and the halogenated metal can be varied within wide limits. A ratio of about 0.25 to about 4 mols of halogenated compound, such as a titanium or vanadium trichloride, to 1 mol of the organometallic compound is suitable. As described in U.S. Pat. No. 3,219,648, such catalyst compositions can also contain an additive compound selected from the group consisting of those polyamines, polyethers, aminoethers, aminoalcohols and hydroxyethers which normally chelate metals. In addition to the named constituents, the catalyst compositions employed in the process of this invention can also include a carrier.

Suitable catalysts for use in the present invention process include $TiCl_3 \cdot 1/3 AlCl_3$ or $TiCl_3$ plus $Al(C_2H_5)_3$ or $Al(C_2H_5)_2Cl$.

Where one so desires to control the molecular weight of the polymer which is being produced, chain transfer agents may be employed both in the preparation of the homopolymer and the gaseous streams A and B. By chain transfer agents are meant those materials which are capable in any given system of terminating the polymerization growth of a given molecule without deactivating or killing the catalyst. The catalyst site is thereby available for further polymerization. The preferred chain transfer agent, of course, is hydrogen. Other suitable chain transfer agents are higher olefins, hydrogen chloride, diethyl aluminum hydride, triethyl aluminum, etc. Thus, in a propylene polymerization reaction, butene-1 could be employed as a chain transfer agent. Likewise, in the polymerization of any of the other alpha olefins, suitable other higher alpha olefins could be employed as chain transfer agents. The use of hydrogen as a molecular weight controlling agent is well known. Hydrogen acts as a chain transfer agent, and it has been found that a close correlation between the hydrogen concentration and the average molecular weight of polymer which is produced follows a relatively constant curve for any given installation. Particularly, in the liquid phase polymerization reaction utilizing a hydrocarbon solvent, the hydrogen gas acts almost instantaneously in its molecular weight control function. Since the monomer is charged at a substantially constant rate, the control of hydrogen addition serves as a direct control on the concentration of hydrogen within the reaction zone, and thereby controls the molecular weight of polymer which is being produced at any given time.

Attention is directed to U.S. Pat. No. 3,472,829 for a detailed discussion of such chain transfer matters and which reference is incorporated, in toto, herein by reference for all intents and purposes.

Generally, the fluidized bed reaction conditions will be as subsequently described. As an example, in the polymerization of polypropylene, the fluidized bed reactor polymerization conditions can include a temperature of about 110° to about 210° F. (preferably 120° F. to 140° F.), a pressure which is sufficient to give a reasonable reaction rate such as 20 to about 200 p.s.i.g. (preferably 40 to 80 p.s.i.g.) and a residence time of 0.5 to 8 hours (preferably 1 to 3 hours).

The frequency at which the gaseous streams A and B are reversed is from about 1 second to about 4 hours, preferably 30 seconds to about 5 minutes.

In the preparation of the homopolymer, it is desired to maintain a high level of active catalyst sites in the resin. The conditions should be selected to produce a polymer containing 500 to 1000 parts per million by weight titanium. Co-catalysts amounts should be those normally employed with this titanium level, for example from about 800 to 1500 parts per million aluminum.

EXAMPLE

An ethylene/propylene block copolymer is prepared in the following manner.

The homopolymer feed is produced in a continuous stirred tank reactor in the presence of a pentane diluent with a catalyst efficiency of approximately 300 grams per gram of titanium catalyst. This product is then passed through a dryer where the product is dried at 140° F. under nitrogen. This material is then added at the rate of 0.30 kilograms per hour to each of the reactors.

The reactor temperature is maintained at 130° F. plus or minus 3° F. The reactor pressure is approximately 3 atmospheres.

Gaseous stream A consists of 95% propylene, 5% hydrogen. Gaseous stream B consists of 20% ethylene, 60% propylene and 20% nitrogen. All percentages are on a molar basis.

The reactors used are 3 inches in diameter with a bed height of 12 inches. Flow rates of both gaseous streams are held at 4 SCFM. The cyclic time for gases A and B is 30 seconds. In conjunction with the injection of gaseous streams A and B into each of the respective reactors, gaseous stream A was injected into one reactor for a period of 30 seconds while concurrent gaseous stream B was injected into the other reactor for the same length of time. At the end of this 30 second period, gaseous streams A and B were automatically switched to the opposite reactors and injected thereinto for a similar period of time. Thereafter, the cycling contained for a total period of time of approximately 2 hours before samples are collected.

The desired end product which consisted of ethylene/propylene block copolymer and homopolypropylene are continuously withdrawn during the reaction period.

The total residence time for the polymer introduced into the fluidized-bed reactor is approximately one hour. The total residence time for the respective gaseous monomer stream introduced into the fluidized-bed reactor is approximately one second.

An ethylene-propylene block copolymer comprising 15 mol% ethylene and 85 mol% propylene is withdrawn from the reactors at the rate of approximately 0.72 kilograms per hour.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A process for the copolymerization of alpha-olefins which comprises the steps of (a) feeding a solid polymeric alpha-olefin which contains an active catalyst into two parallel fluid-bed reactors, a first reactor and a second reactor; (b) concurrently injecting into said first reactor a first olefinic gaseous monomer stream and injecting into said second reactor a second different olefinic gaseous monomer stream for a predetermined period of time; (c) terminating said streams to said first and second reactors; (d) injecting said first and second streams into respectively the second and first reactors for a predetermined period of time; (e) continuously repeating steps (b), (c) and (d) on a cyclic basis in order to produce a block olefinic copolymer therein; and (f) concurrently withdrawing said block olefinic copolymer from said reactors during said cyclic injections.

2. The process as set forth in claim 1 wherein the fluidized bed temperatures are in the range of from about 110° F. to about 210° F.

3. The process as set forth in claim 1 wherein the composition of said first gaseous stream is a mixture of ethylene and propylene.

4. The process as set forth in claim 1 wherein the composition of said second gaseous stream is substantially propylene.

5. The process as set forth in claim 1 wherein the composition of said second gaseous stream is substantially ethylene.

6. The process as set forth in claim 1 wherein the composition of said first and second gaseous streams also contain an inert carrier gas.

7. The process as set forth in claim 1 wherein the composition of said first and second gaseous streams also contain a chain transfer agent.

8. The process as set forth in claim 1 wherein the cyclic injection time for said gaseous streams is from about 1 second to about 4 hours.

9. The process as set forth in claim 1 wherein the pressure of said reactors is from about 20 p.s.i.g. to about 200 p.s.i.g.

10. The process as set forth in claim 1 wherein the active catalyst is a Ziegler catalyst consisting of a composition of $TiCl_3$ and $AlCl_3$, and a co-catalyst consisting of diethylaluminum monochloride.

* * * * *